Figure 2:
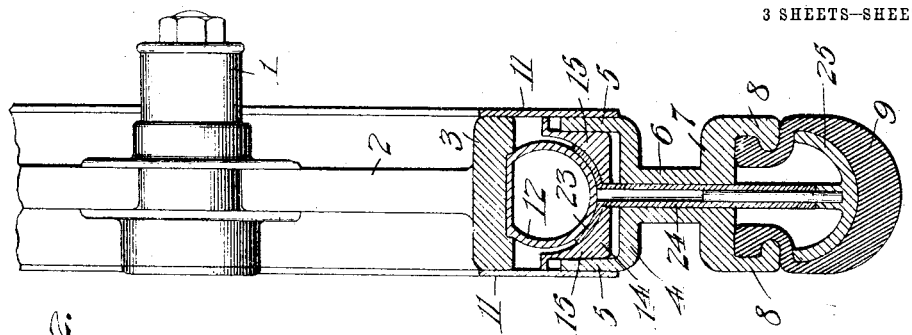

B. SMARTT.
WHEEL.
APPLICATION FILED APR. 20, 1912.

1,052,290.

Patented Feb. 4, 1913.

3 SHEETS—SHEET 1.

Witnesses

Inventor
Brinay Smartt,
By Attorneys

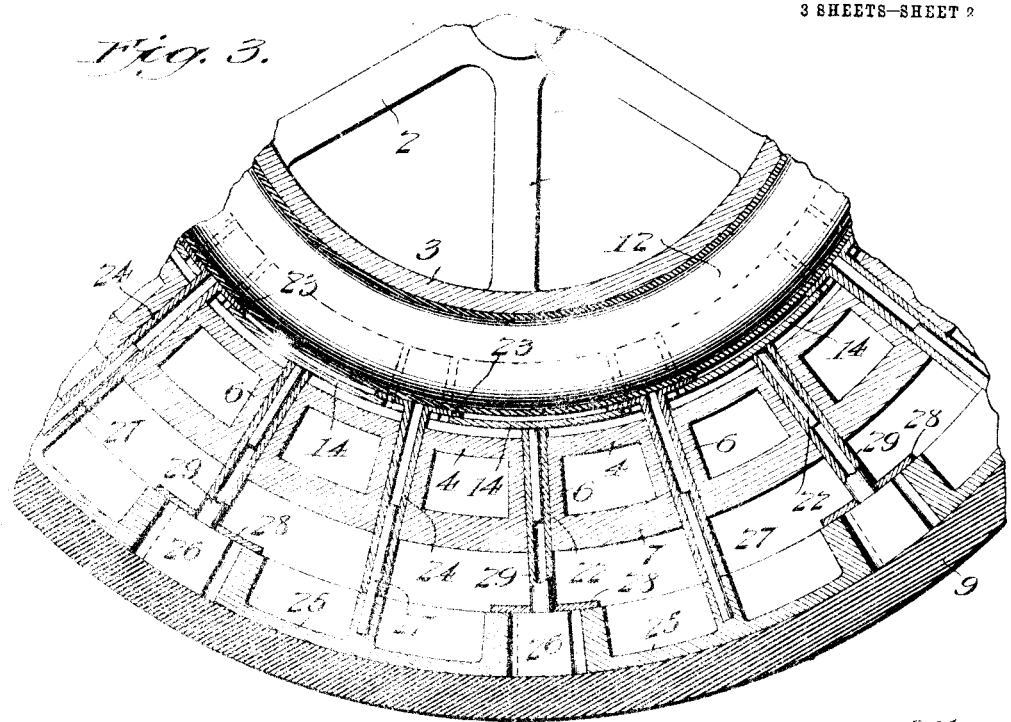

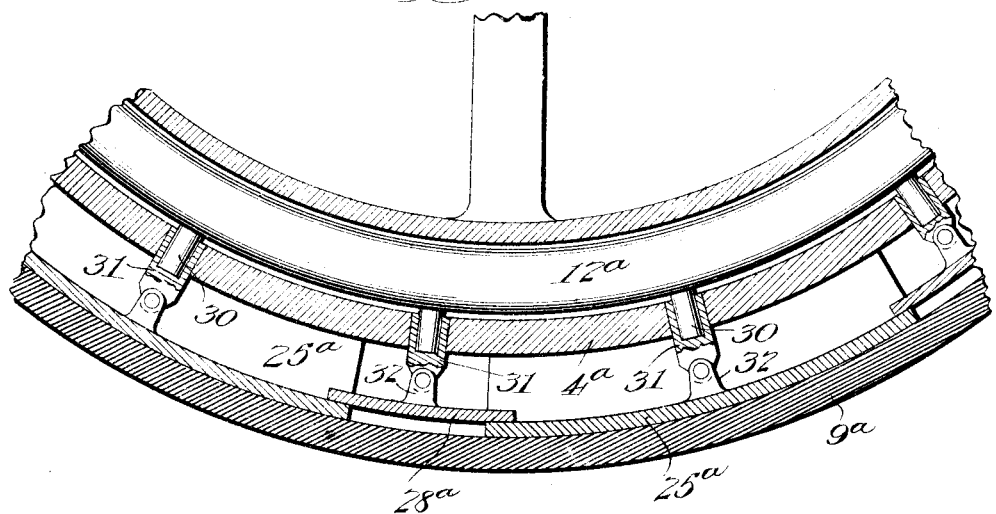
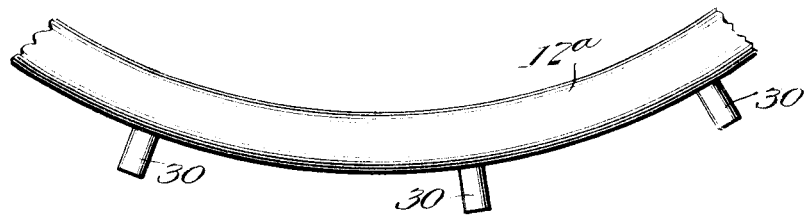

UNITED STATES PATENT OFFICE.

BRINAY SMARTT, OF INDIANAPOLIS, INDIANA.

WHEEL.

1,052,290.  Specification of Letters Patent.  Patented Feb. 4, 1913.

Application filed April 20, 1912. Serial No. 692,147.

*To all whom it may concern:*

Be it known that I, BRINAY SMARTT, a citizen of the United States, residing at Indianapolis, in the county of Marion and State of Indiana, have invented new and useful Improvements in Wheels, of which the following is a specification.

My invention relates to wheels, especially adapted for use in automobiles, but susceptible of use in carriages and other road-vehicles, in bicycles, etc.

One of the great objects of the invention is to provide a wheel having a pneumatic tube, affording the desired resiliency and cushioning effect so much desired in automobiles, but which wheel shall not be rendered inoperative by reason of puncturing of the tire thereof.

Another object of the invention is to provide a wheel, having the advantages noted, which shall not be complicated in structure, and which may thus be manufactured and sold at a moderate figure.

Another object is to provide a wheel which shall be thoroughly durable and efficient in use.

With these objects in view, and others appearing as the specification proceeds, the invention consists in providing a tire which is not rendered useless as the result of punctures, and which is held in an expanded condition by a pneumatic tube, which is protected against the possibility of being punctured.

The invention consists, further, in providing a deformable outer rim made up of interlocking, separable units or sections, around which the rubber tire is disposed.

The invention consists, more specifically, in a plurality of plunger-members coöperating with said outer rim sections and with said pneumatic tube, and controlled by the inflation of the latter, whereby the rubber tire is held under the desired expansive tension.

The invention, in its various aspects and phases, is described in detail hereinafter.

The invention is graphically illustrated in the accompanying drawings, which show a preferred and a modified form of a wheel capable of carrying out the underlying principles of the invention.

In these drawings, in which like reference-characters denote corresponding parts throughout the several views: Figure I is a side elevation of my specially-constructed wheel; Fig. II is a fragmentary transverse section thereof; Fig. III is a fragmentary vertical longitudinal section; Fig. IV is a detached detail perspective view of one of the outer rim units or sections, which, assembled, make up the deformable outer rim; Fig. V is a detached detail perspective view of one of the plunger-members coöperating with the pneumatic tube to hold the rubber tire in proper expanded position, or under proper expansive tension; Fig. VI is a detached detail fragmentary view of two of the outer rim-sections, showing their interlocking feature; Fig. VII is a detached detail perspective view of another one of the plunger-members coöperating with the pneumatic tube; Fig. VIII is a fragmentary longitudinal vertical section of a slightly modified form of wheel; Fig. IX is a fragmentary detail view of the pneumatic tube used in the device shown in Fig. VIII. Fig. X is a fragmentary detail view of the interlocking-fingers.

Figure 1:
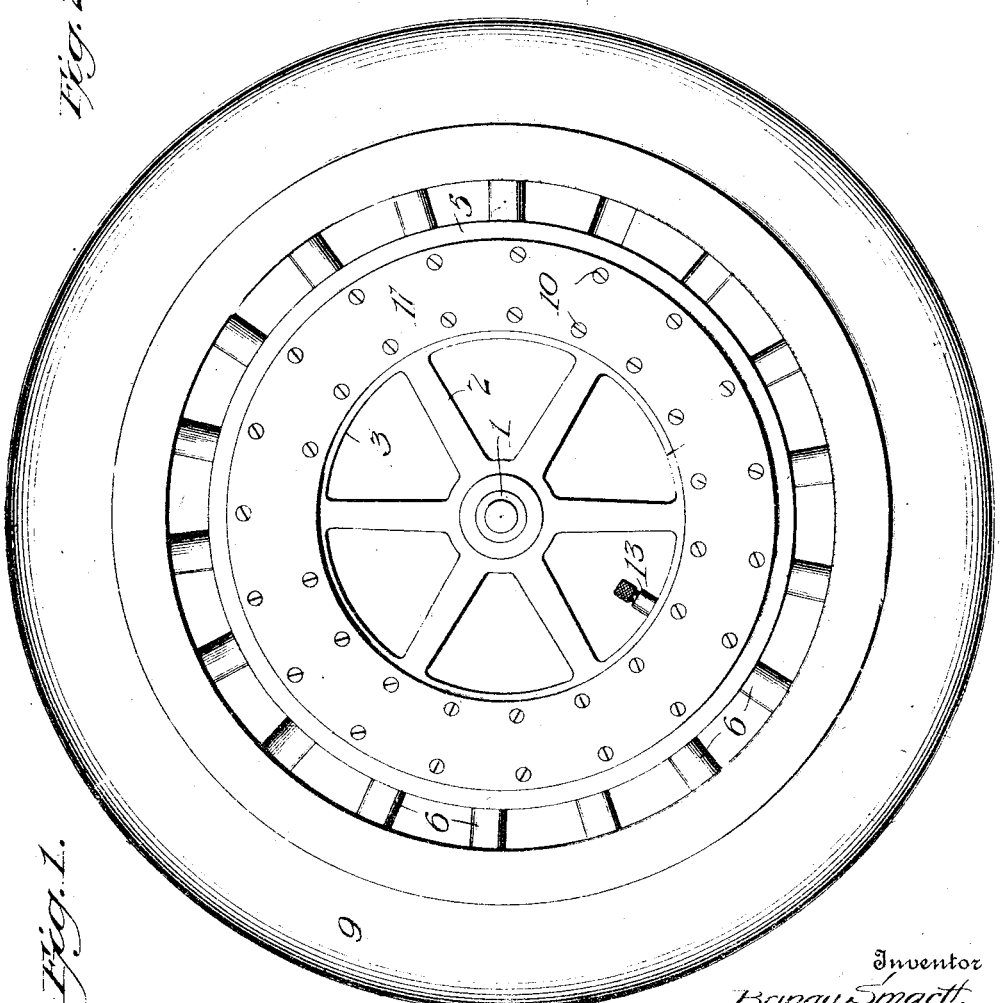

Referring, now, in detail to the drawings, and, first, to Figs. 1 to VII thereof: 1 designates the hub of my specially-constructed wheel, from which radiate spokes 2 to an inner felly 3. Spaced from said inner felly 3 and concentric therewith is an inner rim 4, having circumferential, inturned, edge flanges 5, 5, and integral, radial, hollow spokes 6 connecting said rim with an outer felly 7, provided with circumferential, out-turned, edge flanges 8, constituting a seat for a rubber tire 9. Secured in any suitable manner, as by screws 10, to the inner felly 3 and to the inner-rim flanges 5, 5 are two metallic retaining-rings 11, 11. Between said inner felly 3 and said inner rim 4 is a pneumatic tube 12, provided with an inflating-nipple 13, the tube being adapted to bear against said inner felly 3. Between said tube and said inner rim 4 is a plurality of plunger-carrying members 14, each having a curved face, as shown, against which the expanded tube 12 seats (as shown clearly in Fig. II). The flat outer faces of the sides 15, 15 of each of said members bears against the inner surface of the flanges 5, 5, whereby said member is guided in its movements. Each of said members 14 is also provided with two longitudinal side flanges 16, 16, adapted to engage the ends of the flanges 5, 5. Each of said members 14 is also provided, at one of its ends, with fingers or tongues 17, 18 and 19 and, at the other end, with fingers or tongues 20 and 21. The fingers or tongues of one member 14 interlock with those of the next preceding and the next succeeding member, leaving a space 19ª between each two of said members, for a purpose presently to appear. Each member 14 carries a plunger 22 projecting into one of the hollow spokes 6. Overlapping each two of the interlocking ends of each pair of members 14 is a plunger-carrying disk 23, carrying a hollow plunger 24 reciprocating through one of the hollow spokes 6. Each plunger 24 projects through one of the spaces 19ª.

Obviously, from the construction just described, when the tube 12 is inflated, it bears, on one side, with pressure, against the inner felly 3 and, on the other side, with pressure, against the disks 23 and the members 14, forcing them, with their plungers 24 and 22 outward.

The deformable outer rim is made up of a series of separable, interlocking, longitudinally-curved sections or units 25 adapted to bear against the inner surface of the tire 9 and to maintain the latter under proper expansive tension, when the tube 12 is inflated. Each of said sections or units 25 is provided, at each end, with fingers or tongues 26, the tongues of one section interlocking with those of the next preceding and the next succeeding section, as shown in Fig. VI. When the tube 12 is inflated, the sections of the deformable outer rim are slightly separated, as shown in Fig. VI; but, when said tube is deflated, said sections move closer together, the interlocking feature of the units of the deformable outer rim thus allowing for this expansion and contraction, and insuring, at the same time, that said members or units shall not become entirely separated and thus preventing sidewise movement of one of said units, independently. Each unit 25 carries a stem 27 projecting into one of the hollow plungers 24 and suitably secured thereto, so as to move in unison therewith, the stem thus forming a continuation of the plunger 24. Again each set of interlocking tongues 26, 26 (Fig. VI) bears a disk 28 carrying a hollow stem 29, into which projects one of the plungers 22, the plunger and stem being suitably secured together so as to move in unison, and the stem thus forming a continuation of the plunger.

The operation of my wheel, with the parts correlated as above described, is obvious and, therefore, needs no detailed description.

In Figs. VI and IX, I show a slightly modified form of construction. In this construction, the tube 12ª carries plungers 30 disposed in hollow cylindrical members 31 projecting through the inner rim 4ª and secured to ears 32 alternately carried by disks 28ª and by deformable outer rim-sections or units 25ª engaging the tire 9ª, to maintain the same under proper expansive tension; said disks 28ª connecting and lapping over adjacent ends of each pair of rim-sections 25ª. Obviously, when the tube 12ª is inflated, it moves outward the disks 28ª and the deformable rim-sections 25ª, thus holding the tire 9ª under proper expansive tension.

From the above detailed description of my invention, taken in connection with the drawings, the many advantages inherent in my invention will be clear, especially to those skilled in the art to which my invention appertains.

I am aware that modifications in detail may be resorted to, and that slight departures may be made from the specific device disclosed; but all such modifications as come within the scope of the appended claims fall within the scope and purview of the invention, and constitute no departure from the spirit thereof.

Having thus fully described my invention, what I claim as new and desire to secure by Letters-Patent is:

1. In a wheel, a deformable outer rim, comprising a series of units, a rubber tire disposed over said outer rim, a pneumatic tube, a series of annularly-arranged, plunger-carrying members in contact with said tube, a series of disk-carrying, hollow stems, said plungers projecting into said stems, and each of said disks bearing upon adjacent ends of two of said outer rim units, a series of disks disposed between said tube and said plunger-carrying members, each of said last-mentioned disks being disposed over adjacent ends of two of said plunger-carrying members, said last-mentioned disks carrying hollow plungers, and stems carried by said outer rim-units and projecting into said hollow plungers of said last-mentioned disks.

2. In a wheel, a deformable outer ring comprising a series of units having interlocking ends, a rubber tire disposed over said outer rim, a pneumatic tube, a series of annularly-arranged, plunger-carrying members in contact with said tube, a series of disk-carrying, hollow stems, said plungers projecting into said stems, and each of said disks bearing upon adjacent interlocking ends of two of said outer rim units, a series of disks disposed between said tube and said plunger-carrying members, each of said last-mentioned disks being disposed over adjacent ends of two of said plunger-carrying members, said last-mentioned disks carrying hollow plungers, and stems carried by said outer rim-units and projecting into said hollow plungers of said last-mentioned disks.

3. In a wheel, a deformable outer rim, comprising a series of units, a rubber tire disposed over said outer rim, a pneumatic tube, a series of annularly-arranged, plunger-carrying members in contact with said tube and having interlocking ends, a series of disk-carrying, hollow stems, said plungers projecting into said stems, and each of said disks bearing upon the adjacent ends of two of said outer rim-units, a series of disks disposed between said tube and said plunger-carrying members, each of said last-mentioned disks being disposed over adjacent interlocking-ends of two of said plunger-carrying members, said last-mentioned disks carrying hollow plungers, and stems carried by said outer rim-units and projecting into said hollow plungers of said last-mentioned disks.

4. In a wheel, a deformable outer rim, comprising a series of units having interlocking ends, a rubber tire disposed over said outer rim, a pneumatic tube, a series of annularly-arranged, plunger-carrying members in contact with said tube and having interlocking ends, a series of disk-carrying, hollow stems, said plungers projecting into said stems, and each of said disks bearing upon the interlocking ends of two of said outer rim-units, a series of disks disposed between said tube and said plunger-carrying members, each of said last-mentioned disks being disposed over adjacent interlocking ends of two of said plunger-carrying members, said last-mentioned disks carrying hollow plungers, and stems carried by said outer rim-units and projecting into said hollow plungers of said last-mentioned disks.

In testimony whereof, I have hereunto set my hand in presence of two subscribing witnesses.

BRINAY SMARTT.

Witnesses:
BENNETT S. JONES,
E. S. BRANDENBURG.